United States Patent
D'Amico et al.

(10) Patent No.: US 8,432,122 B2
(45) Date of Patent: Apr. 30, 2013

(54) METHOD AND DEVICE FOR STARTING SINGLE-PHASE ASYNCHRONOUS MOTORS

(75) Inventors: Sebastiano D'Amico, Vicenza (IT); Andrea Fongaro, Altavilla Vicentina (IT); Michele Giardina, Vicenza (IT)

(73) Assignee: Sumoto S.R.L. (IT)

( * ) Notice: Subject to any disclaimer, the term of this patent is extended or adjusted under 35 U.S.C. 154(b) by 308 days.

(21) Appl. No.: 12/736,100

(22) PCT Filed: Mar. 9, 2009

(86) PCT No.: PCT/EP2009/001660
§ 371 (c)(1),
(2), (4) Date: Sep. 9, 2010

(87) PCT Pub. No.: WO2009/112219
PCT Pub. Date: Sep. 17, 2009

(65) Prior Publication Data
US 2011/0001451 A1    Jan. 6, 2011

(30) Foreign Application Priority Data
Mar. 12, 2008   (IT) ............................... VI2008A0062

(51) Int. Cl.
*H02P 1/42*        (2006.01)
(52) U.S. Cl.
USPC ....................................................... 318/786

(58) Field of Classification Search .................... 318/786
See application file for complete search history.

(56) References Cited

U.S. PATENT DOCUMENTS

| | | | |
|---|---|---|---|
| 4,605,888 A | | 8/1986 | Kim |
| 4,786,850 A | | 11/1988 | Chimel |
| 5,512,809 A | * | 4/1996 | Banks et al. ................. 318/778 |
| 5,559,418 A | | 9/1996 | Burkhart |
| 5,831,796 A | * | 11/1998 | Nishida ..................... 360/271.6 |
| 6,320,348 B1 | | 11/2001 | Kadah |
| 7,015,671 B2 | * | 3/2006 | Knab et al. .................... 318/701 |
| 2005/0007062 A1 | * | 1/2005 | Mehlhorn ..................... 318/786 |
| 2008/0018293 A1 | | 1/2008 | Schmidt |

OTHER PUBLICATIONS

International Search Report & Written Opinion from Int'l Application No. PCT/EP2009/001660.

* cited by examiner

*Primary Examiner* — Thomas Dougherty
(74) *Attorney, Agent, or Firm* — R. Neil Sudol; Coleman Sudol Sapone, P.C.

(57) ABSTRACT

A method and device for starting single-phase asynchronous motors which substantially consists in disengaging the start winding of a single-phase asynchronous motor, after its starting, by using a switching means that is connected in series to the start winding. The switching means is controlled as a function of a starting time and of a starting voltage.

22 Claims, 3 Drawing Sheets

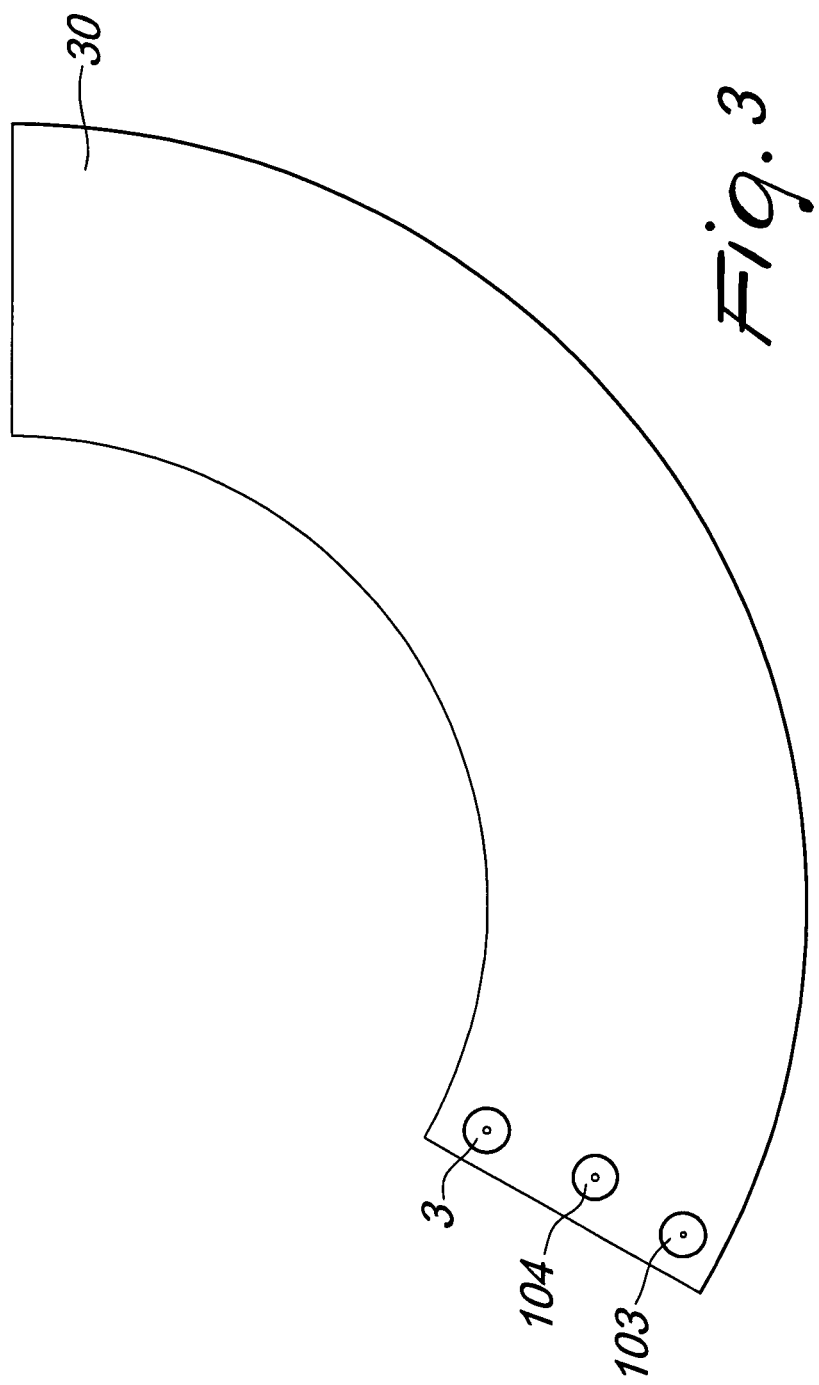

METHOD AND DEVICE FOR STARTING SINGLE-PHASE ASYNCHRONOUS MOTORS

BACKGROUND OF THE INVENTION

The present invention relates to a method and a device for starting single-phase asynchronous motors particularly for motors for low-power actuation systems.

As is known, when a three-phase line is not available, it is possible to use single-phase asynchronous motors, also known as induction motors, which are constructively similar to three-phase asynchronous motors but have only two stator windings, which are phase shifted by 90° and through which currents phase shifted by 90° flow: a run winding and a start winding. The presence of the start winding is necessary to start induction motors, which otherwise would not be able to start spontaneously.

The phase shift between the currents that flow through the two windings, since they are both powered by the same voltage, can be achieved by using a resistive start winding, or by connecting in series to the start winding a start capacitor of appropriate capacitance. Whereas in the second solution the start capacitor can remain permanently inserted or can be disengaged once starting has occurred, if a resistive start winding is used, it is necessary to disengage it after starting.

The simplest solutions for disengaging the start windings are constituted by centrifugal switches, which open or close the circuit as a function of the rotation rate, or by maximum-current or maximum-voltage relays, which open or close the circuit respectively as a function of the current intensity that flows through their coil or of the voltage to which their coil is subjected.

That type of device, being composed of mechanical parts and electrical parts, has many problems linked in particular to the wear that affects both the mechanisms and the electrical contacts.

In order to obviate those problems, electronic starters have been devised which are substantially constituted by a thyristor, connected in series to the start winding, by a pair of bimetallic contacts and by a sensor coil, which is arranged inside the motor. When the motor is connected to voltage for starting, the bimetallic contacts that drive the control input of the thyristor are closed, making it conduct and consequently closing the circuit of the start winding. As the rotation rate increases, the voltage of the sensor coil, which is proportional to the rotation rate of the motor, increases, thus generating an amount of heat that is sufficient to deform the bimetallic contacts, which open and shut down the thyristor. In this manner, the flow of current is interrupted in the start winding and the motor continues to rotate only by virtue of the run winding.

Although those electronic starters perform their task well, they have some limitations when they are subjected to challenging operating conditions and in particular when they are subjected to repeated starts which are very close in time. When the motor stops, it is in fact not immediately ready for a new start, since it necessarily requires an idle time of a few seconds after interruption of the power supply in order to allow the bimetallic contacts to cool down sufficiently to straighten again and be able to make the thyristor conduct, in order to close again the start circuit. Although this drawback may seem scarcely important, in practice it can become very significant depending on the application that the induction motor controlled by the electronic starter is required to perform. One should consider, for example, the case in which these motors are associated with pumps which must supply as regularly as possible a given user device, or that must keep as constant as possible the level of a container filled with water and therefore are subjected to repeated starts that are close in time.

A further aspect relates to the arbitrariness of the time needed to restore the initial conditions in this type of electronic starter after the motor has stopped. In fact, this restore time corresponds substantially to the time that is physically necessary to allow the bimetallic contacts to cool down and close, straightening themselves; therefore, in addition to being difficult to reproduce identically on each different electronic starter, in practice it is not modifiable, except exclusively during design and manufacture.

OBJECTS OF THE INVENTION

The aim of the invention is to solve the problems described above by providing a method and a device, for starting single-phase asynchronous motors, that makes it possible to adjust starting as a function both of a set voltage threshold and of a set time.

Within the scope of this aim, a particular object of the invention is to provide a method and a device, for starting single-phase asynchronous motors, in which the time with respect to which starting is adjusted is programmable and can be modified during use.

A further object of the invention is to provide a method and a device, for starting single-phase asynchronous motors, in which there are no idle times in any repetition of the starting procedure.

A further object of the invention is to provide a device, for starting single-phase asynchronous motors, that can be used for various types of motor without any adaptation of the components and circuitry.

A further object of the invention is to provide a device, for starting single-phase asynchronous motors, that is capable of receiving its power supply directly from the windings of the motor, without requiring auxiliary power supply circuits.

SUMMARY OF THE INVENTION

This aim, these objects and others that will become better apparent hereinafter are achieved by a method for starting single-phase asynchronous motors, comprising disengaging the start winding of a single-phase asynchronous motor, after its starting, by using a switching means that is connected in series to said start winding, characterized in that said switching means is controlled as a function of a starting time and of a starting voltage.

This aim, as well as these and other objects that will become better apparent hereinafter, are also achieved by a device for starting single-phase asynchronous motors, comprising a switching means which is connected in series to the start winding of a single-phase asynchronous motor, in order to disengage it after its starting, characterized in that it comprises a dual-control adjustment means, said dual-control adjustment means being suitable to drive said switching means as a function of a starting time and a starting voltage, said dual-control adjustment means deriving their power supply from the windings of said single-phase asynchronous motor.

BRIEF DESCRIPTION OF THE DRAWING

Further characteristics and advantages will become better apparent from the description of a preferred but not exclusive embodiment of a method and a device for starting single-phase asynchronous motors according to the invention, illustrated by way of non-limiting example in the accompanying drawings, wherein:

FIG. 3 is a view of a base for mounting the device for starting single-phase asynchronous motors according to the invention.

DETAILED DESCRIPTION

Figure 1:
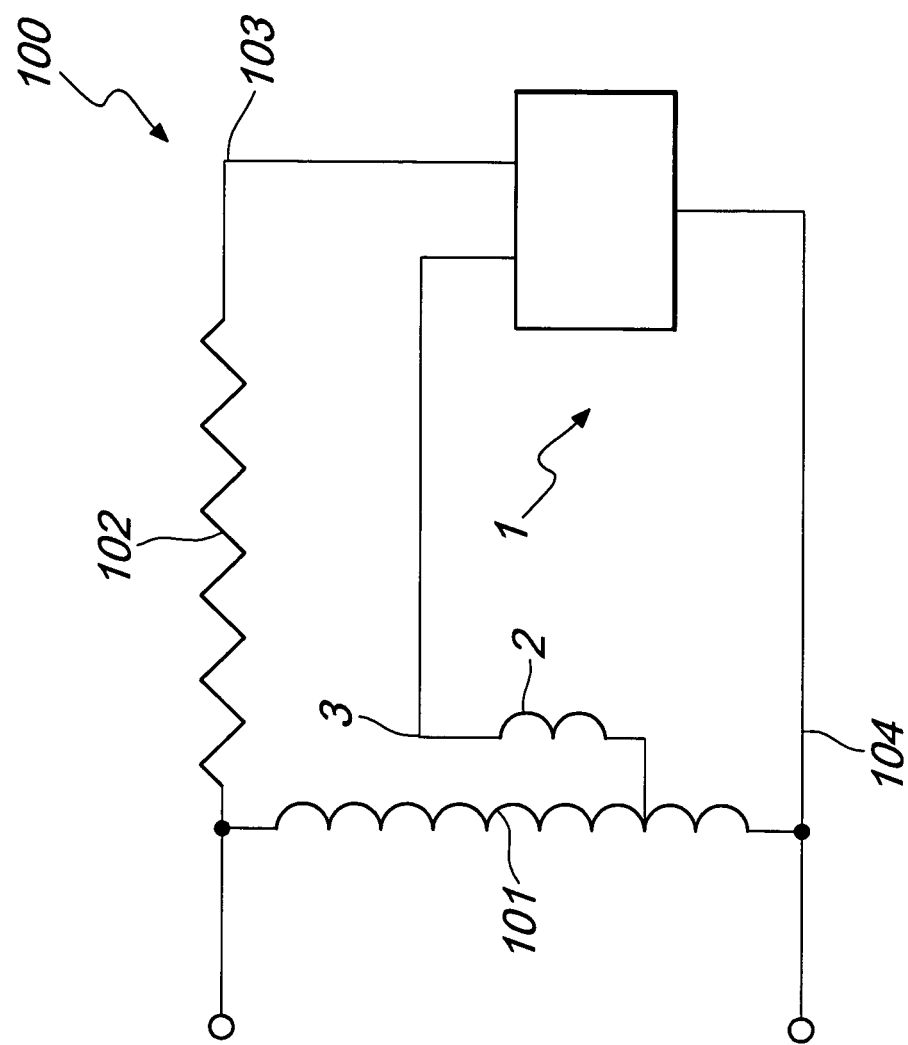
FIG. 1 is a schematic view of a single-phase asynchronous motor, which comprises the device for starting single-phase asynchronous motors according to the invention.
Figure 2:
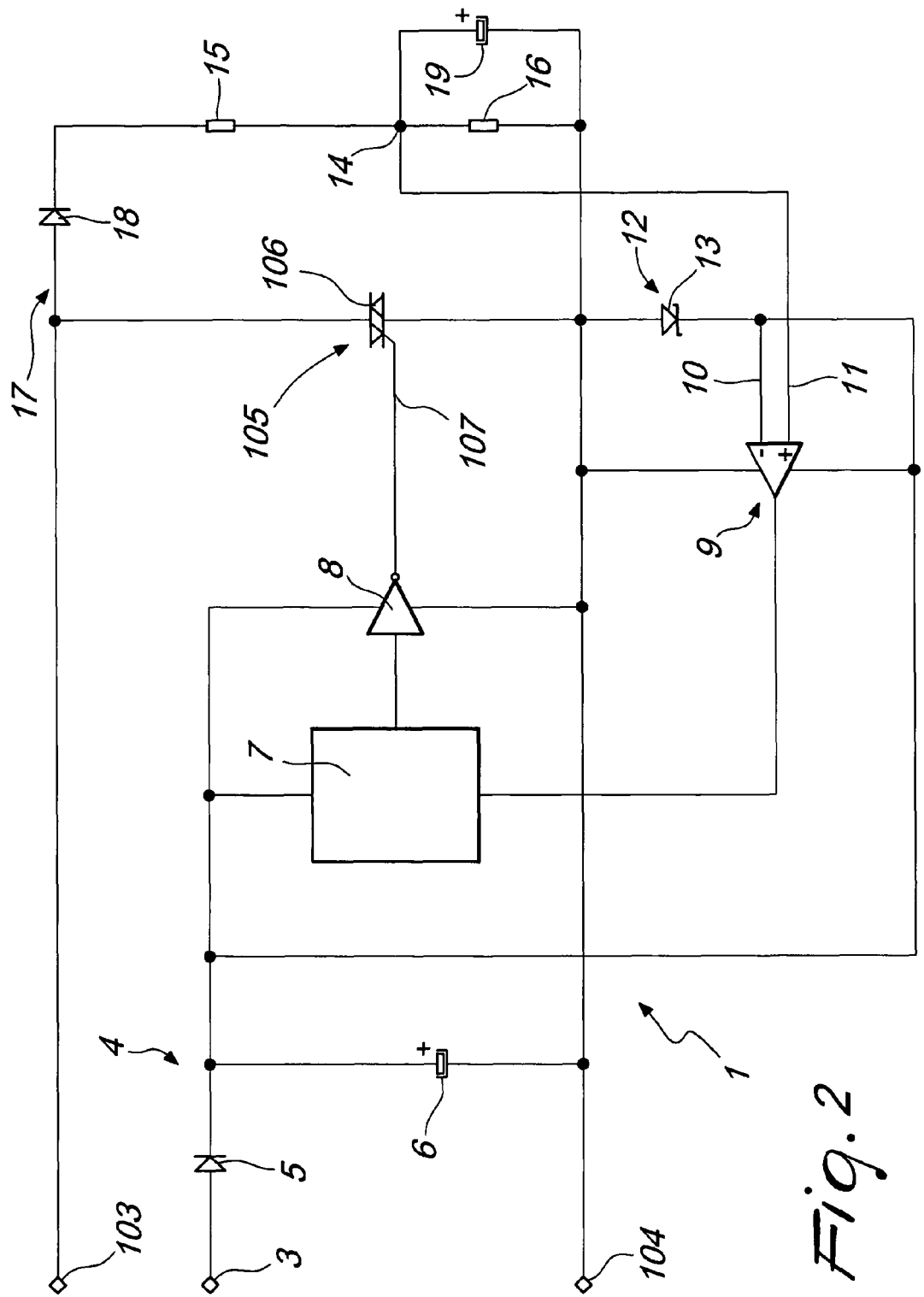
FIG. 2 is a view of a simplified electrical diagram of a device for starting single-phase asynchronous motors according to the invention.

With reference to the above figures, the method for starting single-phase asynchronous motors provided with a run winding 101 and a start winding 102, consists substantially in disengaging the start winding after starting by using a switching means 105 which is connected in series to the start winding 102.

According to the invention, the method for starting single-phase asynchronous motors actuates the switching means 105 as a function of a starting time, which can be preset and subsequently modified, and as a function of a starting voltage, which corresponds to the average value of the rectified voltage established in steady-state conditions across the switching means 105.

In particular, the method for starting single-phase asynchronous motors comprises a first step, which consists in closing the circuit of the start winding 102 for a time that is equal to the starting time.

Subsequently, once the starting time has elapsed, the start voltage begins to be monitored constantly and is checked whether it is higher or lower than a threshold voltage that is preset during manufacture.

The threshold voltage can have a constant amplitude or an amplitude that is proportional to the supply voltage of the motor, according to a behavior obtained by interpolating experimental data.

If, after a certain repetition time, which can be preset and subsequently modified, the start voltage is higher than the threshold voltage, the circuit of the start winding 102 is left open; vice versa, if after the repetition time the start voltage is lower than the threshold voltage, the entire procedure is repeated by closing again the circuit of the start winding 102.

The device, for starting single-phase asynchronous motors, generally designated by the reference numeral 1, comprises a switching means 105, which is connected in series to the start winding 102 of a single-phase asynchronous motor 100, so as to be disengageable once starting has occurred.

The switching means 105 is constituted substantially by a thyristor and in particular by a triac 106, whose two anodes are connected respectively to a terminal 103 of the start winding 102 and to the neutral conductor 104.

According to the invention, the device 1 comprises a dual-control adjustment means, which controls the switching means 105 as a function of a starting time, which as already mentioned can be preset and subsequently modified during the life of the single-phase asynchronous motor 100, and of a starting voltage, which has already been defined as the average value of the rectified voltage that is established in steady-state conditions between the terminal 103 of the start winding 102 and the neutral conductor 104, i.e., across the switching means 105.

The power supply of the dual-control adjustment means is not provided through auxiliary power supply circuits, but is derived directly from the run winding 101 of the single-phase asynchronous motor 100 by means of an auxiliary low-voltage winding 2, which is connected at its terminal 3 to a first rectifier circuit 4, which supplies power to the entire device 1 and comprises a first diode 5 and a first capacitor 6, which acts as a leveling capacitive filter.

The dual-control adjustment means comprises a timer circuit 7, which is connected, by means of a driver logic support component 8, to the gate 107 of the triac 106, so as to switch it on or off as a function of the starting time, consequently closing or opening the circuit of the start winding 102.

The action of the timer circuit 7 is conditioned by a comparator circuit 9 connected thereto, which has, at the inverting input 10, a voltage reference 12, preferably constituted by a Zener diode 13, which imposes a direct voltage that is proportional to the threshold voltage needed to cause the starting or not of the single-phase asynchronous motor 100. A direct voltage that is proportional to the starting voltage is instead provided at the non-inverting input 11 of the comparator circuit 9 by connecting it to the output 14 of a voltage divider, which comprises a first resistive element 15 and a second resistive element 16, which allows to draw a portion of the output voltage of a second rectifier circuit 17, comprising a second diode 18 and a second capacitor 19, which acts as a leveling filter.

The second rectifier circuit 17 is connected in parallel to the switching means 105, and therefore lies between the terminal 103 of the start winding 102 and the neutral conductor 104, allowing to measure the starting voltage.

The entire device 1 is mounted on a arc-shaped base 30 and allows to install it in special single-phase asynchronous motors 100, such as for example submersed motors.

In a further embodiment, not shown in the accompanying figures, the comparator circuit 9 is replaced by a microcontroller that is preset so as to condition the action of the timer circuit 7 as in the preceding embodiment.

The microcontroller, too, like the comparator circuit 9, monitors the direct voltage that is present at the output 14 of a voltage divider that is sized so as to draw a portion of the output voltage of the second rectifier circuit 17. However, said voltage, which is proportional to the starting voltage, in this case is compared with a threshold voltage with an amplitude that is no longer constant but is proportional to the supply voltage of the motor.

The use of the microcontroller in fact allows to preset the value of the amplitude of the threshold voltage, imparting thereto a behavior that is obtained by interpolating suitable experimental data and which, as anticipated, varies as a function of the supply voltage of the motor.

As a consequence of this fact, said dual-control adjustment means can be used for various types of motor without any adaptation of the components and circuitry.

The operation of the device according to the invention is as follows.

Upon starting the single-phase asynchronous motor 100, the supply voltage, which corresponds to the nominal voltage of the motor, is applied to the run winding 101, and the entire device 1 is supplied with power through the auxiliary low-voltage winding 2 and the first rectifier circuit 4.

From the instant when the supply voltage is applied to the device 1 and for the starting time, which can be modified according to the most disparate requirements but is preferably set at approximately 0.5 seconds, the timer circuit 7 activates the triac 106, driving its gate 107 by means of the driver logic support component 8.

Subsequently, for a time equal to the repetition time, which can be modified according to the most various requirements but is preferably set at approximately 10 seconds, the timer circuit 7 remains insensitive to the command that arrives from the comparator circuit 9, which allows to discriminate or not the repetition of the procedure for starting the single-phase asynchronous motor 100. The voltage reference 12 is in fact connected on the inverting input 10 of the comparator circuit 9 and by means of the Zener diode 13 imposes a direct voltage that is proportional to the threshold voltage and can be quantified at a value of 6 V, while a direct voltage that is proportional to the starting voltage, in the specific case equal to 0.0207 times the starting voltage, is established on its non-inverting input 11. This multiplication coefficient of 0.0207 corresponds to the ratio between the voltage reference 12, in the specific case equal to 6 V, and the threshold voltage, in the specific case equal to an effective value of approximately 290 V, and is the combined result of the rectification of the voltage established between the terminal 103 of the start winding 102 and the neutral conductor 104, by means of the second rectifier circuit 17, and of the subsequent attenuation through the resistive divider constituted by the first resistive element 15 and the second resistive element 16.

If, after the repetition time has elapsed, the direct voltage established at the non-inverting input 11 of the comparator circuit 9 is higher than the direct voltage set by the voltage reference 12 at the inverting input 10 of the comparator circuit 9, i.e., if the starting voltage is higher than the threshold voltage, the timer circuit 7 is driven so as to keep the triac 106 off and consequently the circuit related to the start winding remains open.

Vice versa, if, after the repetition time has elapsed, the direct voltage established at the non-inverting input 11 of the comparator circuit 9 is lower than the direct voltage imposed by the voltage reference 12 at the inverting input 10 of the comparator circuit 9, i.e., the starting voltage is lower than the threshold voltage, the timer circuit 7 is driven so as to make the triac 106 conduct and consequently the circuit related to the start winding is closed for a time that is equal to the starting time and the entire procedure is repeated.

If the comparator circuit 9 is replaced by the microcontroller, the operation of the device 1 remains substantially identical to the one already described.

However, in this case the direct voltage proportional to the starting voltage is compared with a threshold voltage whose amplitude is no longer constant but is proportional to the supply voltage of the motor.

Accordingly, with the same dual-control adjustment means it is possible to manage the starting of various types of motor without any adaptation of the components and the circuitry.

In practice it has been found that the method and the device for starting single-phase asynchronous motors according to the invention fully achieve the intended aim, and allow to adjust starting as a function both of a certain voltage threshold and as a function of a certain time, which can be preset and modified during use, and also allow to repeat the starting procedure without idle times.

The device is capable of drawing the power supply directly from the windings of the motor, without requiring an auxiliary power supply circuit, and can be used for various types of motor, without any adaptation of the components and of the circuitry.

This application claims the priority of Italian Patent Application No. VI2008A000062, filed on Mar. 12, 2008, the subject matter of which is incorporated herein by reference.

What is claimed:

1. A method for starting single-phase asynchronous motors, comprising disengaging a start winding of a single-phase asynchronous motor, after a starting thereof, by using a switching means that is connected in series to said start winding, wherein said switching means is controlled as a function of a starting time, which is preset, and of a starting voltage.

2. The method according to claim 1, wherein said starting voltage corresponds to an average value of a rectified voltage that is established in steady-state conditions across said switching means.

3. The method according to claim 1, further comprising the following steps:
   closing a circuit of said start winding for a time that is equal to said starting time;
   constantly monitoring said starting voltage in the time that follows said starting time;
   checking whether said starting voltage is higher or lower than a threshold voltage
   repeating the preceding steps if, after a repetition time, said starting voltage is lower than said threshold voltage.

4. The method according to claim 1, that wherein said starting time is preset and modifiable.

5. The method according to claim 3, wherein said threshold voltage can be preset and modified.

6. The method according to claim 3, wherein said repetition time can be preset and modified.

7. A device for starting single-phase asynchronous motors, comprising a switching means which is connected in series to a start winding of a single-phase asynchronous motor, in order to disengage said start winding after starting thereof, further comprising a dual-control adjustment means, said dual-control adjustment means being suitable to drive said switching means as a function of a starting time, which is preset, and a starting voltage, said dual-control adjustment means deriving a power supply from windings of said single-phase asynchronous motor.

8. The device according to claim 7, wherein said dual-control adjustment means comprise at least one low-voltage auxiliary winding, which is derived from a run winding of said single-phase asynchronous motor, for the complete supply of power to said dual-control adjustment means.

9. The device according to claim 8, wherein said dual-control adjustment means comprises at least one first rectifier circuit, the input of which is connected to said low-voltage auxiliary winding and the output of which is connected to said dual-control adjustment means in order to supply said dual-control adjustment means with power.

10. The device according to claim 8, wherein said first rectifier circuit comprises at least one first diode.

11. The device according to claim 9, wherein said first rectifier circuit comprises at least one first capacitor, in order to reduce the ripple voltage, acting as a leveling capacitive filter.

12. The device according to claim 7, wherein said dual-control adjustment means comprise at least one timer circuit, which is connected by means of a driver logic support component to said switching means in order to drive said switching means as a function of said starting time and of said repetition time.

13. The device according to claim 12, wherein said dual-control adjustment means comprise at least one comparator circuit, the output of which is connected to said timer circuit in order to activate or inhibit said timer circuit as a function of said starting voltage.

14. The device according to claim 13, wherein said dual-control adjustment means comprise at least one voltage reference, which is connected to the inverting input of said comparator circuit, said threshold voltage being proportional to the voltage imposed by said voltage reference.

15. The device according to claim 14, wherein said voltage reference comprises at least one Zener diode.

16. The device according to claim 12, wherein said dual-control adjustment means comprise at least one microcontroller, the output of which is connected to said timer circuit in order to activate or inhibit said timer circuit as a function of said starting voltage.

17. The device according to claim 9, wherein said dual-control adjustment means comprises at least one second rectifier circuit, which is connected in parallel to said switching means.

18. The device according to claim 17, wherein said second rectifier circuit comprises at least one second diode.

19. The device according to claim 17, wherein said second rectifier circuit comprises at least one second capacitor for reducing the ripple voltage by acting as a leveling capacitive filter.

20. The device according to claim 17, wherein said dual-control adjustment means comprise at least one timer circuit, which is connected by means of a driver logic support component to said switching means in order to drive said switching means as a function of said starting time and of said repetition time, said dual-control adjustment means further comprising at least one comparator circuit, the output of which is connected to said timer circuit in order to activate or inhibit said timer circuit as a function of said starting voltage, said dual-control adjustment means additionally comprising at least one microcontroller, the output of which is connected to said timer circuit in order to activate or inhibit said timer circuit as a function of said starting voltage, said second rectifier circuit comprising a voltage divider, the output of which is connected to the non-inverting input of said comparator circuit or to an input of said microcontroller, said starting voltage being proportional to the voltage established in said output of said voltage divider.

21. The device according to claim 12, wherein said switching means comprise at least one thyristor, a gate terminal of which is connected to an output of said driver logic support component, said thyristor being connected in series to said start winding.

22. The device according to claim 7, wherein said dual-control adjustment means comprise an arc-shaped base, for mounting the entire device.

* * * * *

UNITED STATES PATENT AND TRADEMARK OFFICE
CERTIFICATE OF CORRECTION

| | | |
|---|---|---|
| PATENT NO. | : 8,432,122 B2 | Page 1 of 1 |
| APPLICATION NO. | : 12/736100 | |
| DATED | : April 30, 2013 | |
| INVENTOR(S) | : Sebastiano D'Amico et al. | |

It is certified that error appears in the above-identified patent and that said Letters Patent is hereby corrected as shown below:

On the title page item 73 should read
Assignee: EBARA CORPORATION

Signed and Sealed this
Twenty-eighth Day of January, 2014

Michelle K. Lee
*Deputy Director of the United States Patent and Trademark Office*